(12) United States Patent
Welch et al.

(10) Patent No.: US 7,866,933 B2
(45) Date of Patent: Jan. 11, 2011

(54) CONTAINER TRAILER

(75) Inventors: James W. Welch, 3216 Hollow Creek Rd., Germantown, TN (US) 38138; Claude D. White, Jr., Cordova, TN (US)

(73) Assignee: James W. Welch, Germantown, TN (US)

( * ) Notice: Subject to any disclaimer, the term of this patent is extended or adjusted under 35 U.S.C. 154(b) by 0 days.

(21) Appl. No.: 12/326,643

(22) Filed: Dec. 2, 2008

(65) Prior Publication Data
US 2010/0135757 A1 Jun. 3, 2010

(51) Int. Cl.
*B60P 3/00* (2006.01)
(52) U.S. Cl. ..................................... 414/458
(58) Field of Classification Search .............. 414/458, 414/486, 498, 471, 539, 540
See application file for complete search history.

(56) References Cited

U.S. PATENT DOCUMENTS

| | | | |
|---|---|---|---|
| 3,958,707 A | 5/1976 | Deppe | |
| 4,053,073 A | 10/1977 | Franchin | |
| 4,120,413 A | 10/1978 | Harris et al. | |
| 4,168,931 A | 9/1979 | Harris | |
| 4,231,709 A | 11/1980 | Corsetti | |
| 4,297,068 A | 10/1981 | Concha et al. | |
| 4,321,977 A | 3/1982 | Tenn | |
| 4,500,248 A | 2/1985 | Kramer | |
| 4,515,518 A | 5/1985 | Gilbert et al. | |
| 4,588,345 A | 5/1986 | Anttila | |
| 4,619,578 A | 10/1986 | Routledge | |
| 4,645,406 A | 2/1987 | Cooper et al. | |
| 4,792,272 A | 12/1988 | Oswald et al. | |
| 4,863,334 A * | 9/1989 | Girerd | 414/458 |
| 4,936,733 A * | 6/1990 | Girerd | 414/458 |
| 4,961,680 A | 10/1990 | Riedl et al. | |
| 5,006,031 A * | 4/1991 | Fossing et al. | 414/458 |
| 5,417,540 A | 5/1995 | Cox | |
| 5,678,977 A | 10/1997 | Nordlund | |
| 5,800,114 A * | 9/1998 | Secondi | 414/458 |
| 6,019,565 A * | 2/2000 | Gesuale | 414/458 |
| 6,155,770 A * | 12/2000 | Warhurst | 414/498 |
| 6,257,167 B1 * | 7/2001 | Joaquim | 114/344 |

(Continued)

FOREIGN PATENT DOCUMENTS

DE 3132165 A1 6/1982

OTHER PUBLICATIONS

PCT Invitation to Pay Additional Fees And, Where Applicable, Protest Fee for Application No. PCT/US2009/066361, dated Mar. 25, 2010, 7 pages.

(Continued)

*Primary Examiner*—Saúl J Rodríguez
*Assistant Examiner*—Joshua I Rudawitz
(74) *Attorney, Agent, or Firm*—Fish & Richardson P.C.

(57) ABSTRACT

A trailer includes a coupling to attach the trailer to a tractor, and a frame attached to the coupling. The frame is positionable as a single unit about a container such that the frame can be attached to the container in four regions of the container to lift the container. The trailer has road wheels for long-haul transportation over road systems. The trailer frame can be positioned about the container by laterally expanding and retracting, pivoting about a horizontal axis, and pivoting about a vertical axis.

21 Claims, 15 Drawing Sheets

U.S. PATENT DOCUMENTS

| | | | |
|---|---|---|---|
| D456,583 S * | 4/2002 | Schmidt | D34/28 |
| 6,830,422 B2 | 12/2004 | Whitley | |
| 6,840,724 B1 | 1/2005 | Trescott | |
| 6,910,844 B2 | 6/2005 | Trescott | |
| 7,100,896 B1 * | 9/2006 | Cox | 254/92 |
| 7,293,802 B2 * | 11/2007 | Bachman et al. | 280/839 |
| 2003/0180132 A1 * | 9/2003 | Morreim | 414/458 |
| 2006/0285959 A1 | 12/2006 | Warhurst et al. | |
| 2007/0108204 A1 | 5/2007 | Warhurst et al. | |

OTHER PUBLICATIONS

PCT International Search Report and Written Opinion for PCT/US2009/066361, dated Jun. 25, 2010, 18 pages.

* cited by examiner

CONTAINER TRAILER

BACKGROUND

Containers are used to transport goods between locations. The container is placed at a source location and loaded with goods, and the loaded container is transported to a destination location for drop off. Typically, to transport the container, the container is lifted by a fork-lift and placed onto a trailer and the trailer is hauled to the destination location using a tractor. At the destination location, the container is again lifted by a fork-lift to unload the container from the trailer.

SUMMARY

To facilitate transport of containers by tractor-trailers, a trailer that enables loading of the container onto the trailer without the need for a separate lifting machine is desirable. The disclosed trailer includes a frame and a coupling. The frame can be positioned about the container as a single unit, attached to the container to lift the container and support the container during transport, and attached to a tractor to haul the trailer during transportation, including long-haul transportation.

In one aspect, a trailer includes a coupling configured and arranged to attach the trailer to a tractor, and a frame attached to the coupling. The frame is positionable as a single unit about a container such that the frame can be attached to the container in four regions of the container to lift the container.

This, and other aspects, may include one or more of the following features. The frame includes road wheels for long-haul transportation of the trailer over conventional road systems. The frame is configured to laterally expand and contract. The frame is positionable as a single unit about the container by advancement of the frame relative to the container when expanded. The frame is positioned for transport of the container when retracted.

In illustrated embodiments, the frame includes a frame member configured to pivot about an axis between a first position and a second position. The frame is positionable as a single unit about the container by advancement of the frame relative to the container when in the first position. The frame is positioned for transport of the container when in the second position. The axis is a horizontal axis and the frame member pivots upward toward the first position. The axis is a vertical axis and the frame member pivots outward toward the first position. The frame member includes two members that each pivot outward in opposite directions. The frame includes at least one supporting wheel that supports the frame when the road wheels are off the ground.

In another aspect, a method includes positioning a trailer as a single unit about a container, attaching the trailer to regions of four lower corners of the container, lifting the container off the ground using the trailer, and attaching the trailer to a tractor. The trailer has road wheels for long-haul transportation of the trailer over conventional road systems.

This, and other aspects, may include one or more of the following features. The method further includes expanding the frame to position the trailer about the container as a single unit. Also, the method includes pivoting the frame to position the trailer about the container as a single unit. The frame is pivoted about a horizontal axis or a vertical axis.

In another aspect, a trailer frame includes two longitudinal members, and a third member connecting the two longitudinal members. The third member is actuatable to laterally expand and retract the frame such that the frame is positionable as a single unit about a container for attaching the frame to the container in four regions of the container to lift the container. The trailer frame includes at least two road wheels for long-haul transportation of the trailer over conventional road systems.

This, and other aspects, may include one or more of the following features. The frame further includes at least one support wheel supporting the frame when the frame moves laterally.

In another aspect, a trailer frame includes a member configured and arranged to pivot about a horizontal axis such that the frame is positionable as a single unit about a container for attaching the frame to the container in four regions of the container to lift and the container, and at least two road wheels for long-haul transportation of the trailer over conventional road systems.

This, and other aspects, may include one or more of the following features. The frame further includes a support member to support the frame when the road wheels are off the ground. The support member is pivotable between a support position and a transport position.

In another aspect, a trailer frame includes first and second members each configured and arranged to pivot about a vertical axis such that the frame is positionable as a single unit about a container for attaching the frame to the container in four regions of the container to lift the container, and at least two road wheels for long-haul transportation of the trailer over conventional road systems.

This, and other aspects, can include one or more of the following features. The frame further includes a first support wheel associated with the first member and a second support wheel associated with the second member to support the frame when the road wheels are off the ground.

The details of one or more implementations of the specification are set forth in the accompanying drawings and the description below. Other features and aspects of the specification will become apparent from the description, the drawings, and the claims.

DETAILED DESCRIPTION

Figure 1:
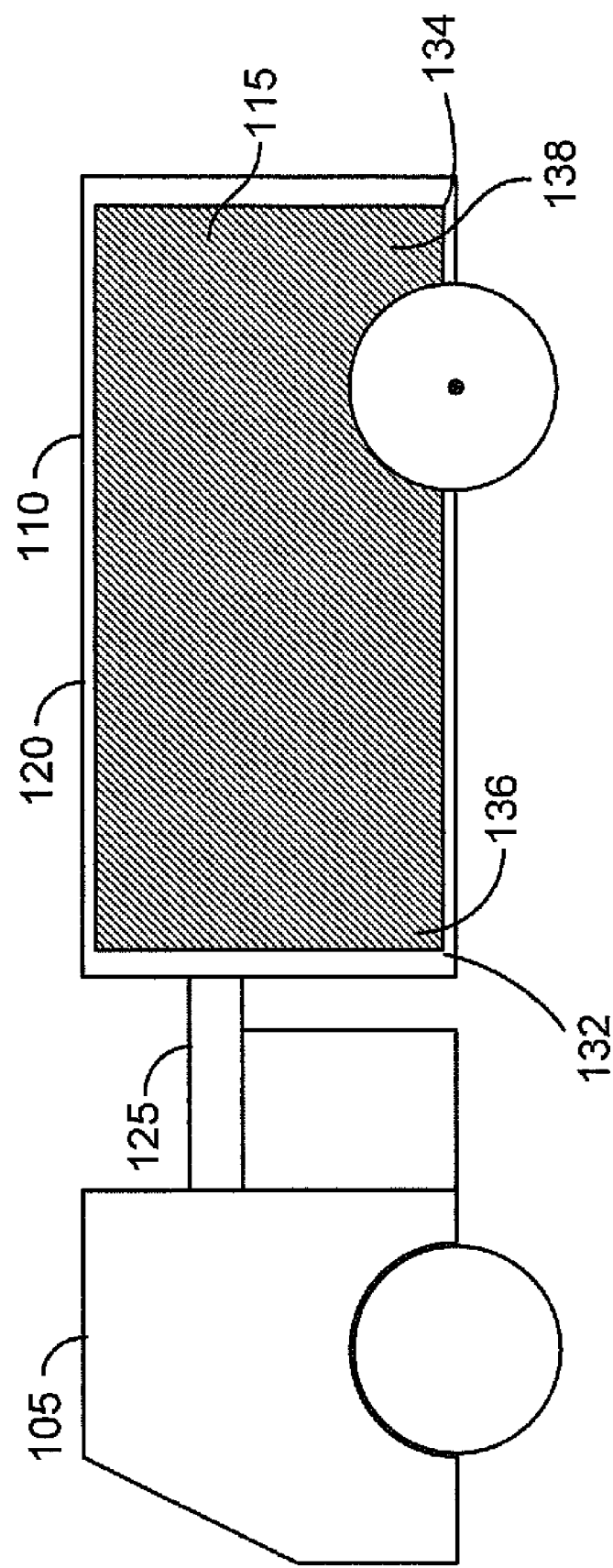
FIG. 1 is a schematic of a trailer for lifting and transporting a container.

Referring to FIG. 1, a trailer 110 to load, unload, and transport a container 115 includes a coupling 125 that attaches the trailer 110 to a conventional tractor 105. The trailer 110 includes a frame 120, attached to the coupling 125. The frame 120 is positionable as a single unit about the container 115 to attach the frame to the container 115 to transport the container 115. The coupling 125 is, for example, a conventional converter dolly that couples the tractor and trailer by, for example, a 5th wheel.

After the frame is positioned about the container, as discussed further below, the container is lifted by attaching the frame 120 to the container 115 in regions 136, 138 of the lower four lower corners 132, 134 of the container 115 (only two corners being shown), and actuating the frame 120 to lift the container 115 off the ground. Upon lifting, the frame 120 provides support to and secures the container 115 when the trailer 110 is hauled by the tractor 105 in conventional short and long haul trucking. To do so, in various implementations described below, the frame 120 includes road wheels, castor wheels, and inter-connected members that expand, contract, and/or pivot about horizontal or vertical axes.

Figure 2A:
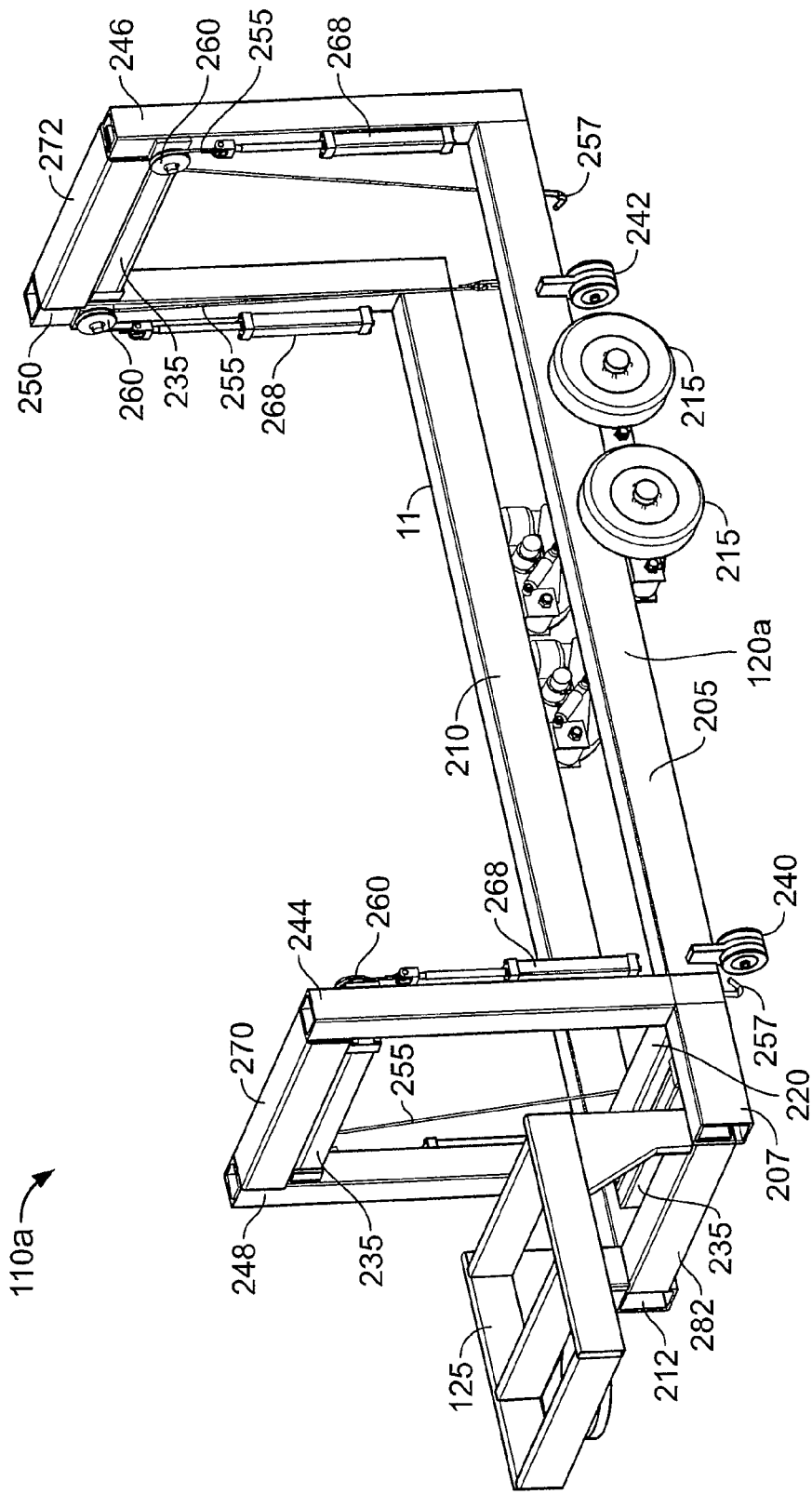
FIG. 2A is a perspective view of the trailer shown in a retracted configuration.

Referring to FIG. 2A, in one implementation, a trailer 110a to load, unload, and transport a container 115, for example, an ISO container of standard dimensions, includes a frame 120a having a plurality of interconnected members, for example, two longitudinal members 205 and 210, four vertical members 244, 246, 248, and 250, three transverse members 220, 270, and 272 connecting the longitudinal and vertical members, and a further transverse member 282. The transverse member 282 is located between the front ends 207, 212 of the two longitudinal members 205, 210, respectively, and the coupling 125 is attached to the transverse member 282. The transverse members 220, 270, 272, and 282 are actuated, as described below, to laterally expand and retract the frame 120a.

The frame 120a includes road wheels 215 coupled to each of the two longitudinal members 205 and 210 to permit the tractor 105 to haul the trailer 110a during conventional transportation of the container 115 over roadways and the like. To support the frame 110a during lateral expansion and retraction, the frame 110a includes two castor wheels 240 and 242 attached to the first longitudinal member 205 and oriented in a transverse direction. During lateral expansion and retraction of the frame 120, the castor wheels 240 and 242 contact the ground, and the road wheels 215 are raised off the ground. When the trailer 110a is hauled by the tractor 105, the castor wheels 240 and 242 are off the ground and the road wheels 215 contact the ground.

Figure 2B:
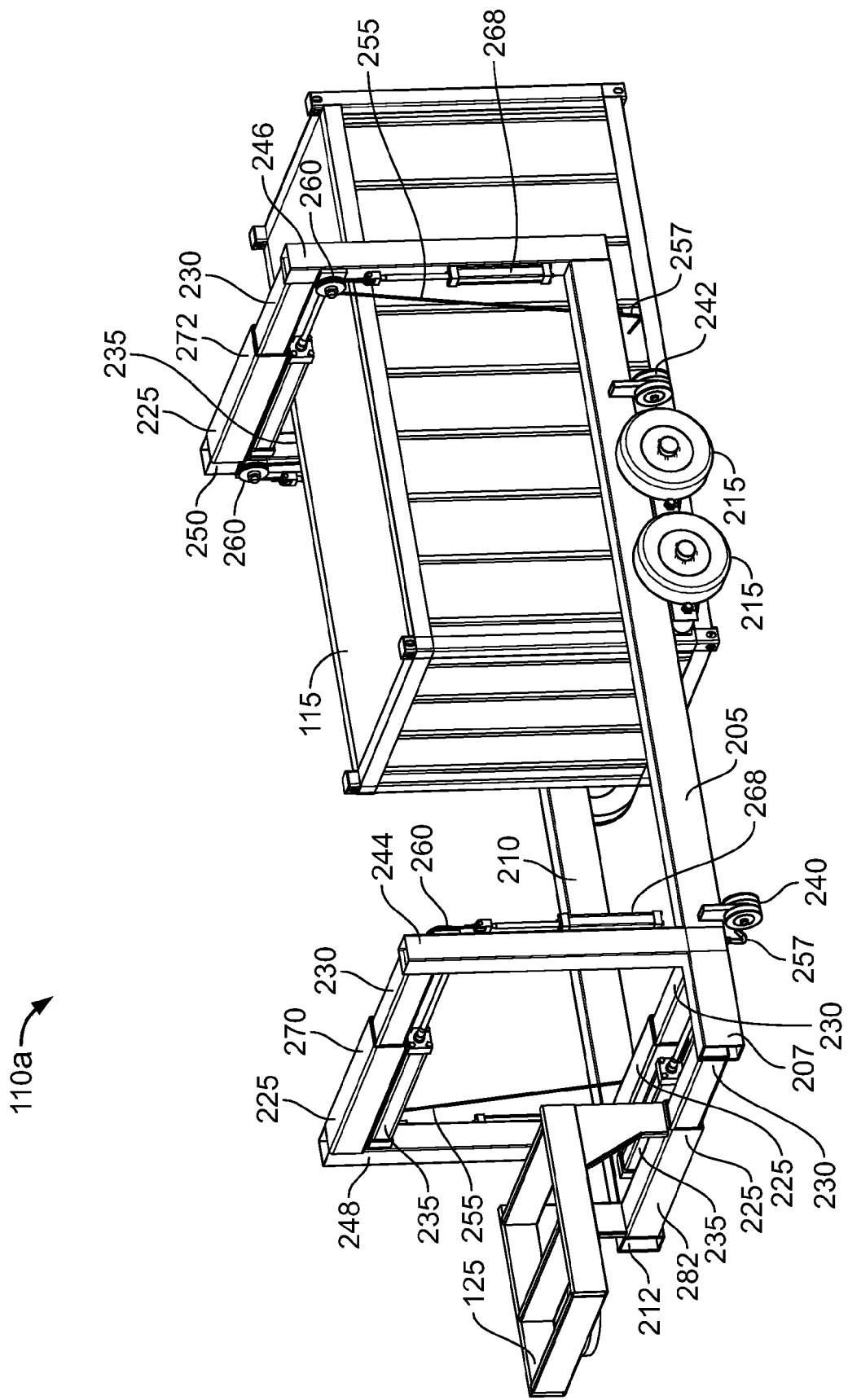
FIG. 2B is a perspective view of the trailer shown in an expanded configuration and positioned about a container.
Figure 2C:
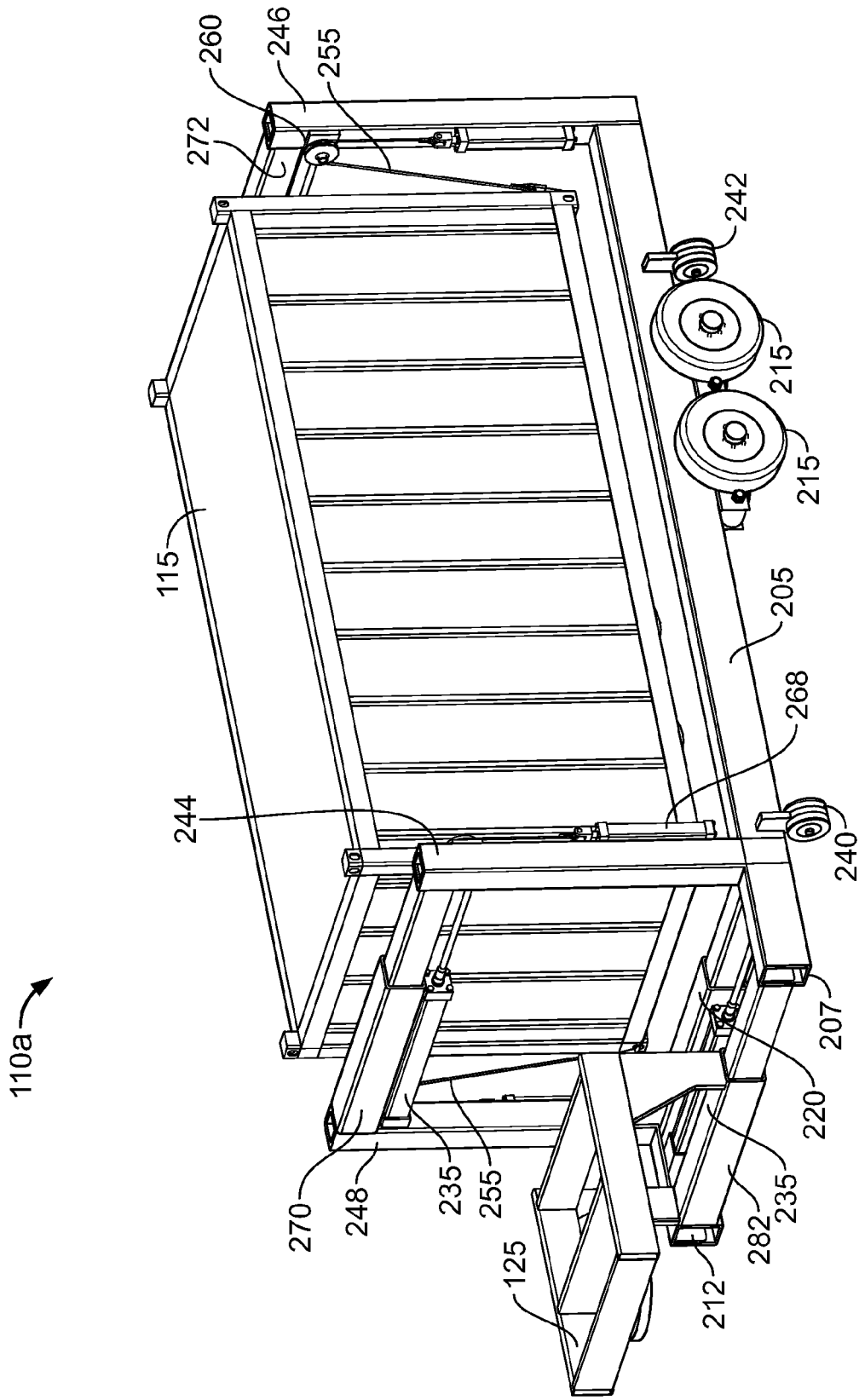
FIG. 2C is a perspective view of the trailer shown lifting the container.
Figure 2D:
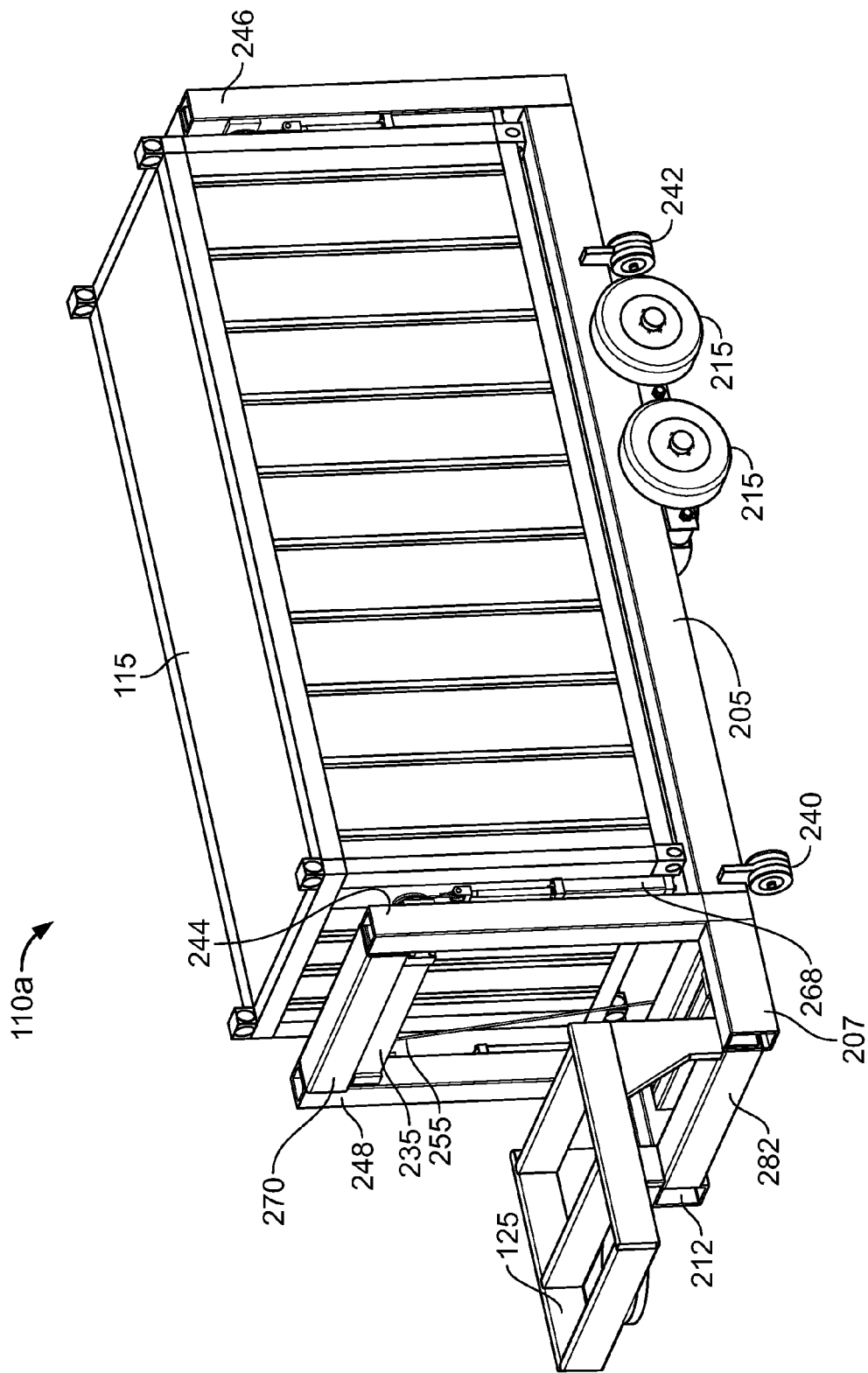
FIG. 2D is a perspective view of the trailer and container in position for transport.

Referring to FIG. 2B, to position the frame 120a as a single unit about the container 115, the user aligns the back end of the frame 120a adjacent the front face of the container 115, raises the road wheels 215 on the longitudinal member 205 to lower the frame 120a onto the castor wheels 240 and 242 and lifts the road wheels 215 off the ground. Then, the user laterally expands the frame 120a, lowers the road wheels 215 to the ground raising the castor wheels 240 and 242 off the ground, and backs the trailer 110a around the container 115. Referring to FIG. 2C, to load the container 115 on the frame 120a, the user attaches cables 255, discussed below, to the four lower corners of the container 115, and lifts the container 115 off the ground. Referring to FIG. 2D, to prepare the container 115 for transportation, the user raises the road wheels 215 lowering the castor wheels 240 and 242 to the ground, and retracts the frame 120a to position the frame below the container. Then, the user lowers the road wheels 215 to the ground raising the castor wheels 240 and 242 off the ground. The user then lowers the container 115 onto the frame 120a, for example, onto the longitudinal members 205 and 210, and secures the container 115 to the frame 120a. For example, the user secures the container 115 to the frame 120a using a twistlock such as TANDEMLOC™ twistlock tiedowns (TANDEMLOC, Inc., Havelock, NC).

To enable the raising and lowering of the frame 120a and the lowering and raising of the road wheels 215 to and from ground level, the frame 120a includes mechanisms (FIGS. 3 and 4, described below) that attach the road wheels 215 to the longitudinal members 205 and 210. The transverse members 220, 270, 272, and 282 each include a stationary portion 225 and sliding portion 230 to enable lateral expansion and retraction of the frame 120a controlled, for example, by hydraulics 235. The coupling 125 is attached to the stationary portion 225 of the transverse member 282.

To lift and to secure the container 115, the frame 120a includes cables 255 (FIG. 2A) attached to the four vertical members 244, 246, 248 and 250 for attaching the frame 120 to the container 115 to lift and lower the container 115. The cables 225 terminate in hooks 257 that are received in standard couplings at the four lower corners of the container 115. The cables 225 route around pulleys 260 attached at the upper end of each of the four vertical members and are controlled by hydraulics 268. The cables and the pulleys are attached such that the tension in the cables, as the container 115 is lifted off the ground, is uniform. Further, the bottom of the container 115 remains substantially parallel to the ground as the container 115 is lifted and lowered.

Techniques similar to those described with reference to FIGS. 2A-2D are used to unload the container 115. For example, using the tractor 105, the user positions the trailer 110a at a location where the container 115 is to be unloaded. The user raises the road wheels 215 lowering the frame 120a until the castor wheels 240, 242 contact the ground and the road wheels 215 are off the ground. Then, the user actuates the transverse members 220, 270, 272, and 282 to laterally expand the frame 120a, and lowers the container 115 to the ground by actuating the hydraulics 268 that operate the cables 255. Once the container 115 is on the ground, the user detaches the cables from the container 115, and lowers the road wheels 215 raising the castor wheels 240, 242 off the ground. Then, using the tractor 105, the user pulls the trailer 110a away from the container 115, and retracts the frame 120a for transport.

Figure 3A:
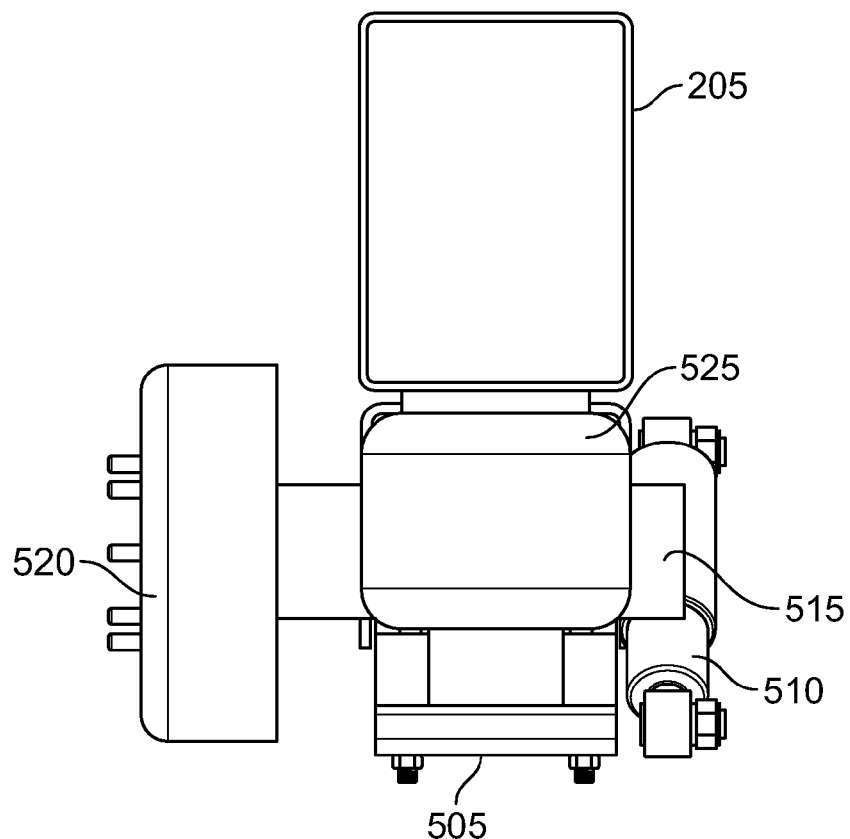
FIG. 3A is a front view of a mechanism for connecting road wheels to the frame.
Figure 3B:
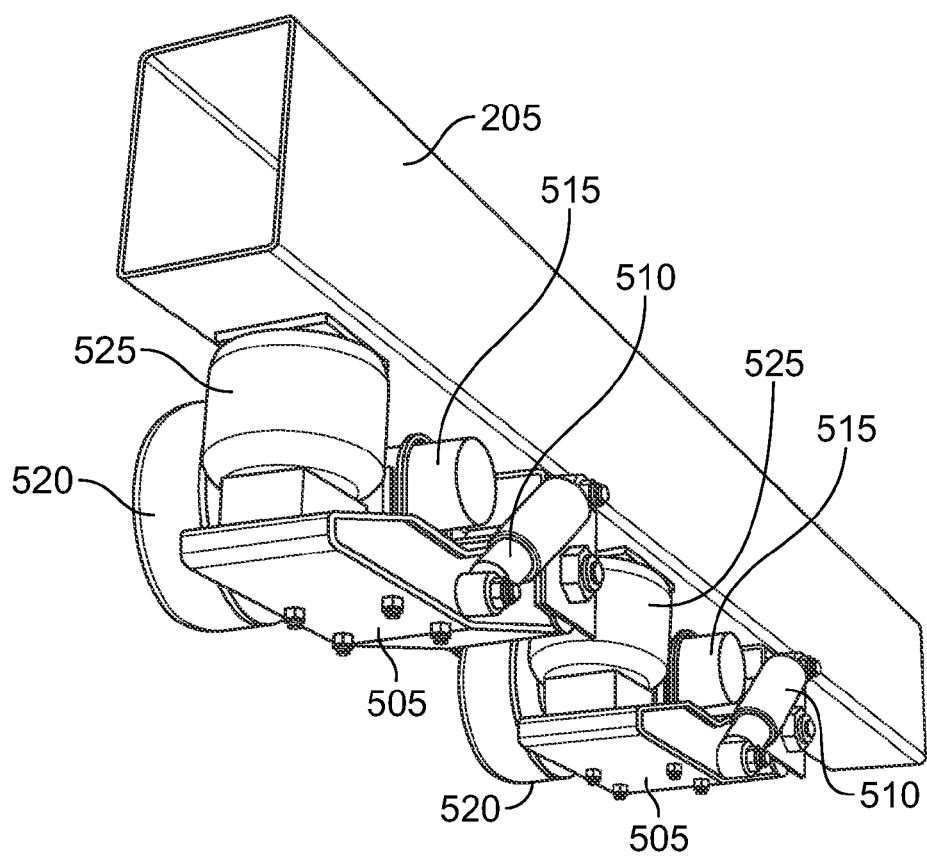
FIG. 3B is a perspective view of the mechanism of FIG. 3A.
Figure 3C:
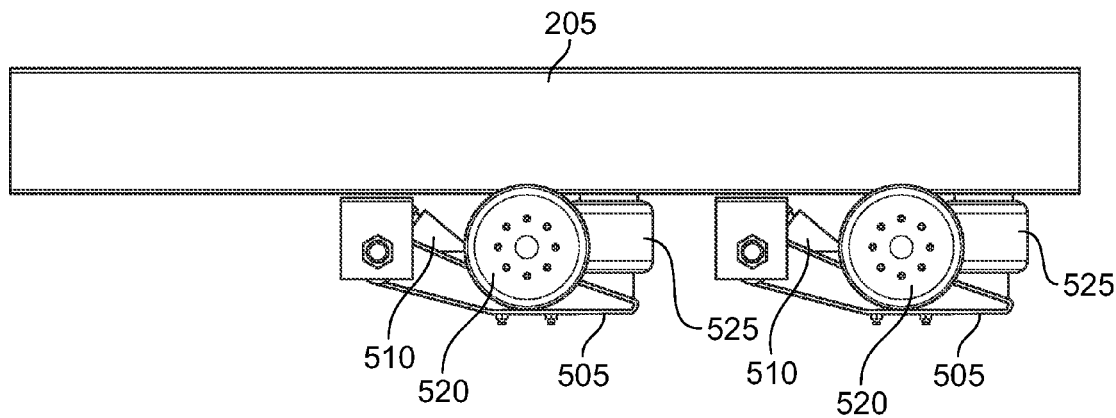
FIG. 3C is a side view of the mechanism of FIG. 3A.
Figure 4A:
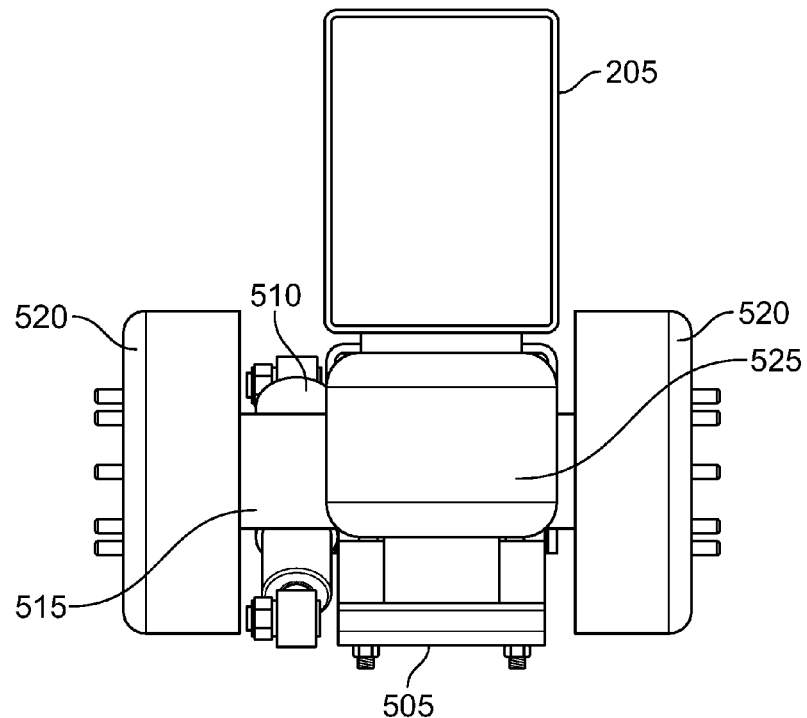
FIG. 4A is a front view of a mechanism for connecting road wheels to the frame.
Figure 4B:
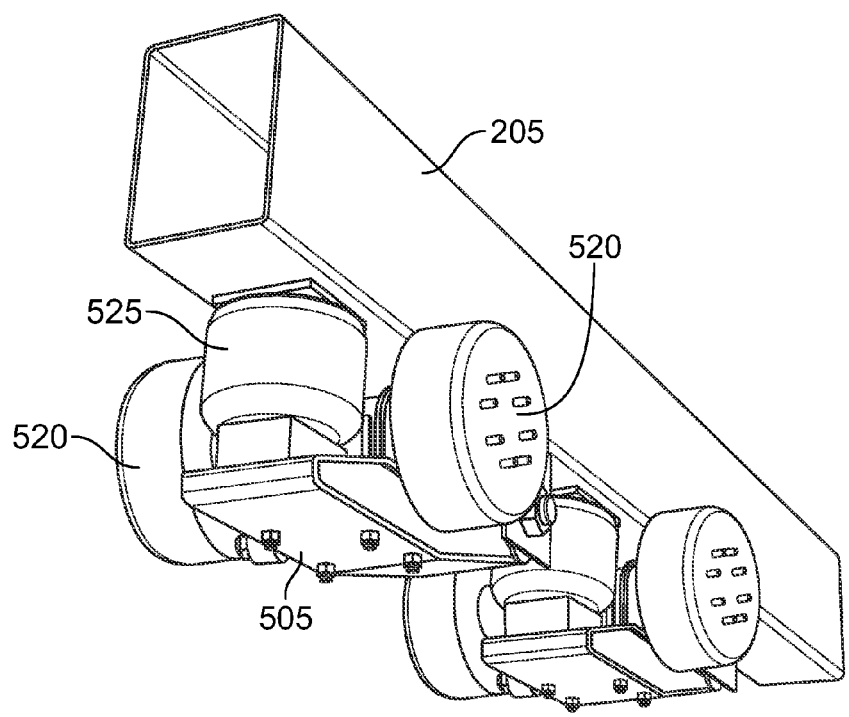
FIG. 4B is a perspective view of the mechanism of FIG. 4A.
Figure 4C:
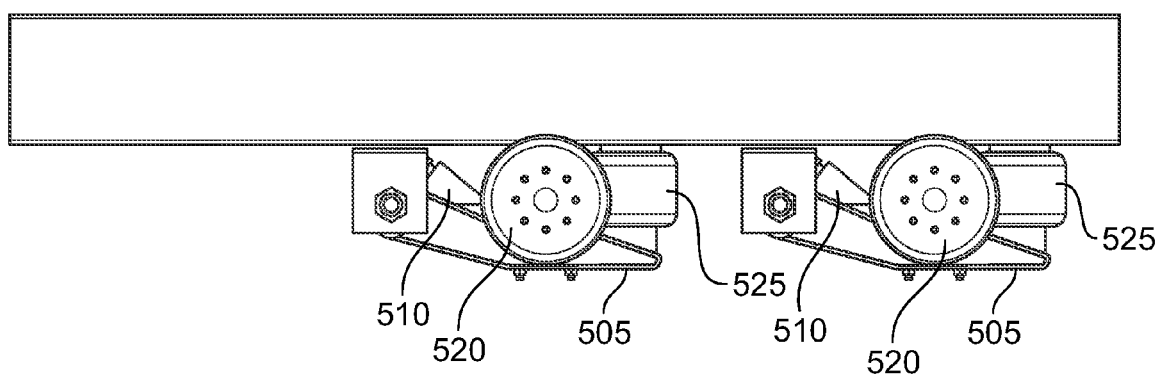
FIG. 4C is a side view of the mechanism of FIG. 4A.

Referring to FIGS. 3A-3C, in one implementation, the mechanism by which each road wheel 215 is attached to longitudinal member 205 of the frame 120a to permit the road wheels 215 to be raised and lowered relative to the frame 120a includes a support element 505 pivotally connected to the longitudinal member 205. Mounted to the support element 505 are a wheel axle 515, an airbag 525 and an actuator 510. The actuator 510 is also attached to the longitudinal member 205 such that the extension and retraction of the actuator 510 acts to pivot the support element 505. The wheel axle 515 is coupled to a wheel hub 520 of the road wheel 215, such that when the actuator 515 is actuated, the support element 505 pivots to raise or lower the wheel axle 515, thereby raising or lowering the wheel hub 520 and the attached road wheel 215. Thus, to lower the frame 120a onto castor wheels 240 and 242, the actuator 510 is retracted to raise the road wheels 215 into ground contact; and to raise the frame 120a onto the road wheels 215, the actuator 510 is extended to lower the road wheels 215. An alternative implementations of the mechanism can include springs in addition to or in place of the air bag 325.

In another implementation of the mechanism by which the road wheels 215 are attached to the longitudinal member 205 of the frame 120a, two wheel hubs 520 are attached to wheel axle 515 at either end of the wheel axle 515 such that at each axle, one wheel is outside the frame 120a and one wheel is inside the frame 120a. In this construct, the frame expands further to clear the container when compared to the frame that uses the mechanism of FIGS. 3.

Figure 5A:
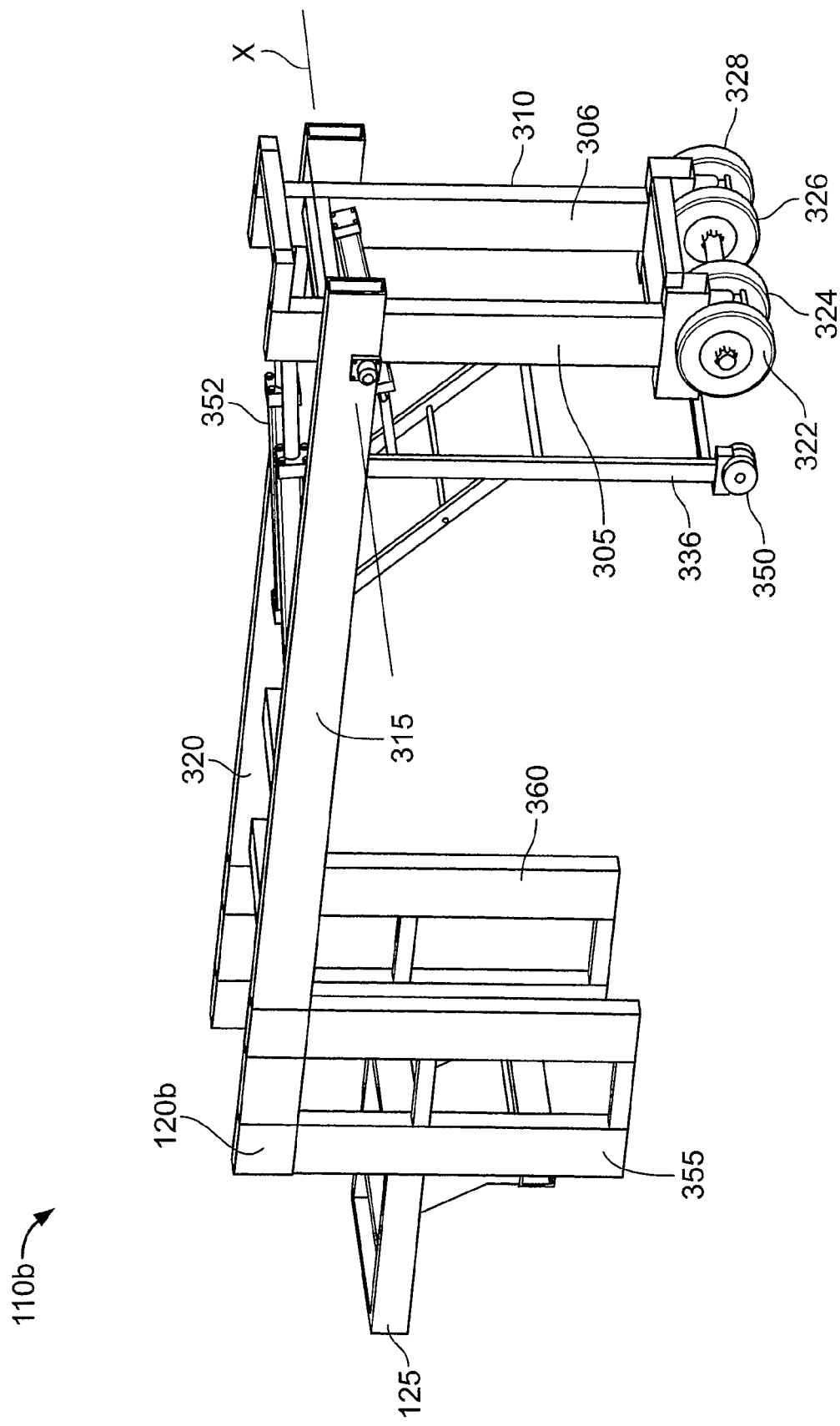
FIG. 5A is a perspective view of another embodiment of a trailer shown with a rear support member in a vertical configuration.
Figure 5B:
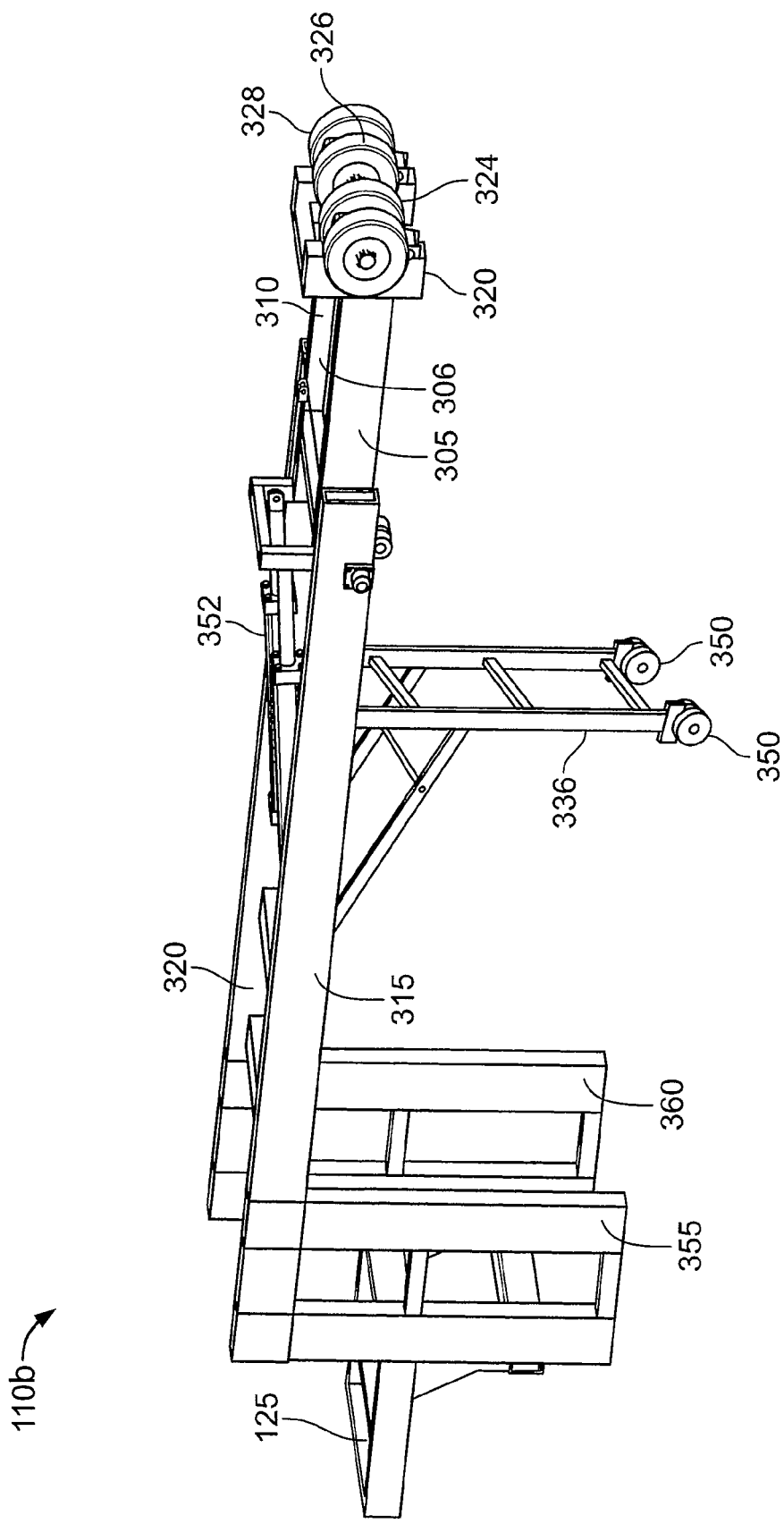
FIG. 5B is a perspective view of the trailer of FIG. 5A shown with the rear support member in a horizontal configuration.

Referring to FIGS. 5A and 5B, in another implementation, rather than laterally expanding and retracting the frame, a trailer 110b to load, unload, and transport a container 115 is positioned about the container as a single unit by rotation of a rear frame member about a horizontal axis. Trailer 110b includes a frame 120b having two vertical members 355, 360, and a rear frame member 310. Rear frame member 310 pivots about a horizontal axis, X, such that with the rear frame member 310 in the vertical position of FIG. 5A the frame 120b is in position for transport, and with the rear frame member 310 in the horizontal position of FIG. 5B the frame 120b is in position to be advanced around the container 115. The frame 120b includes two longitudinal members 315 and 320 connecting the members 355, 360, and 310, and a support member 336 that supports the frame 120b when the rear frame member 310 is raised off the ground.

The support member 336 is pivotably coupled to the longitudinal members 315 and 320, and includes castor wheels 350 on which the frame 120b is movable. The rear frame member 310 includes two struts 305, 306 to which road wheels 322, 324, 326, and 328 are mounted to permit the tractor 105 to haul the trailer 110b, and contact wheels 366 that rest against the top of the container when the frame is advanced about the container. To pivot the rear frame member 310 such that the road wheels 322, 324, 326 and 328 clear the top surface of the container 115, the frame 120 includes hydraulic pistons 352 attached between the longitudinal members 315 and 320 and the rear frame member 310.

Figure 5C:
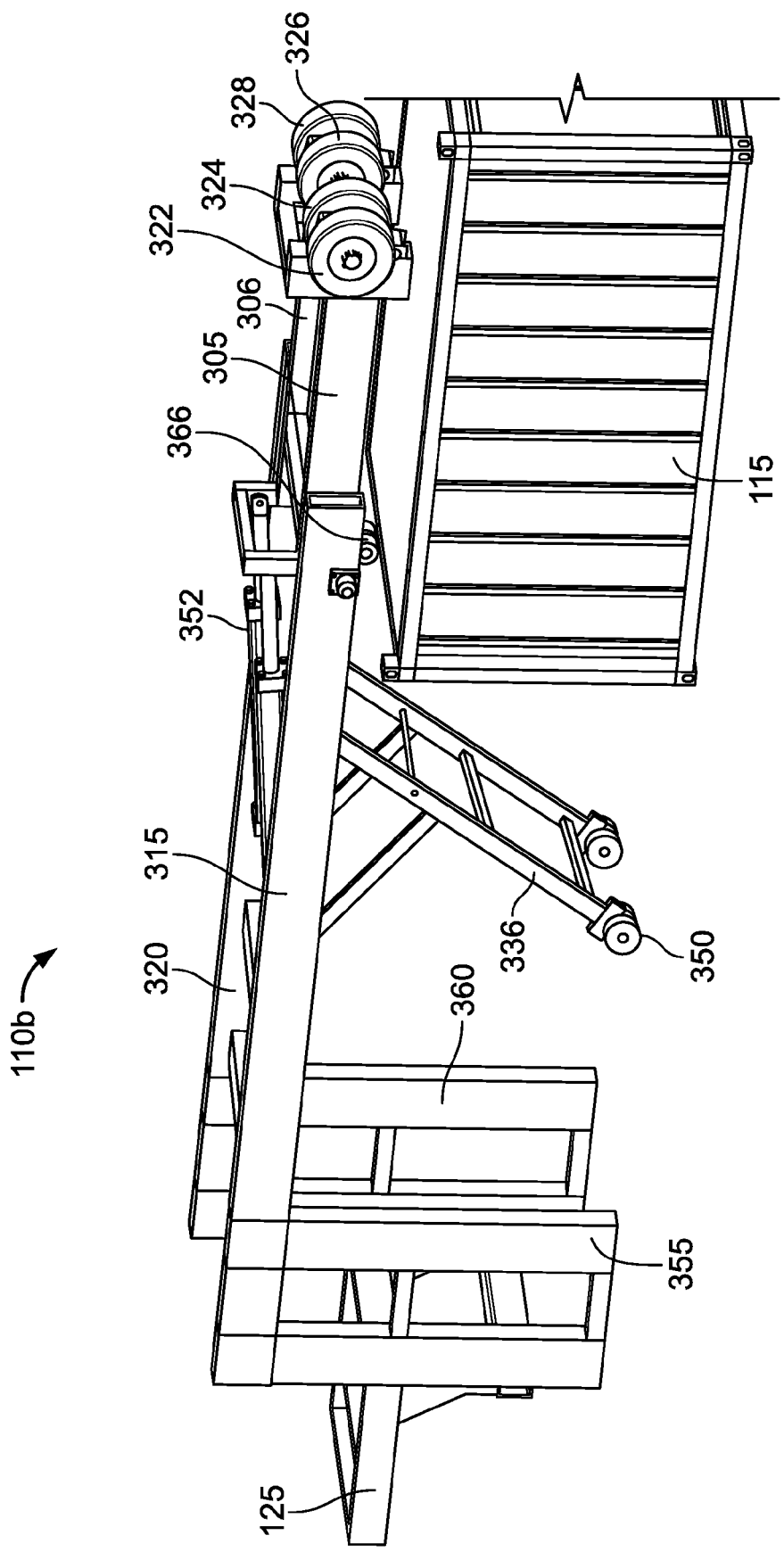
FIG. 5C is a perspective view of the trailer of FIG. 5A shown positioned about a container.
Figure 5D:
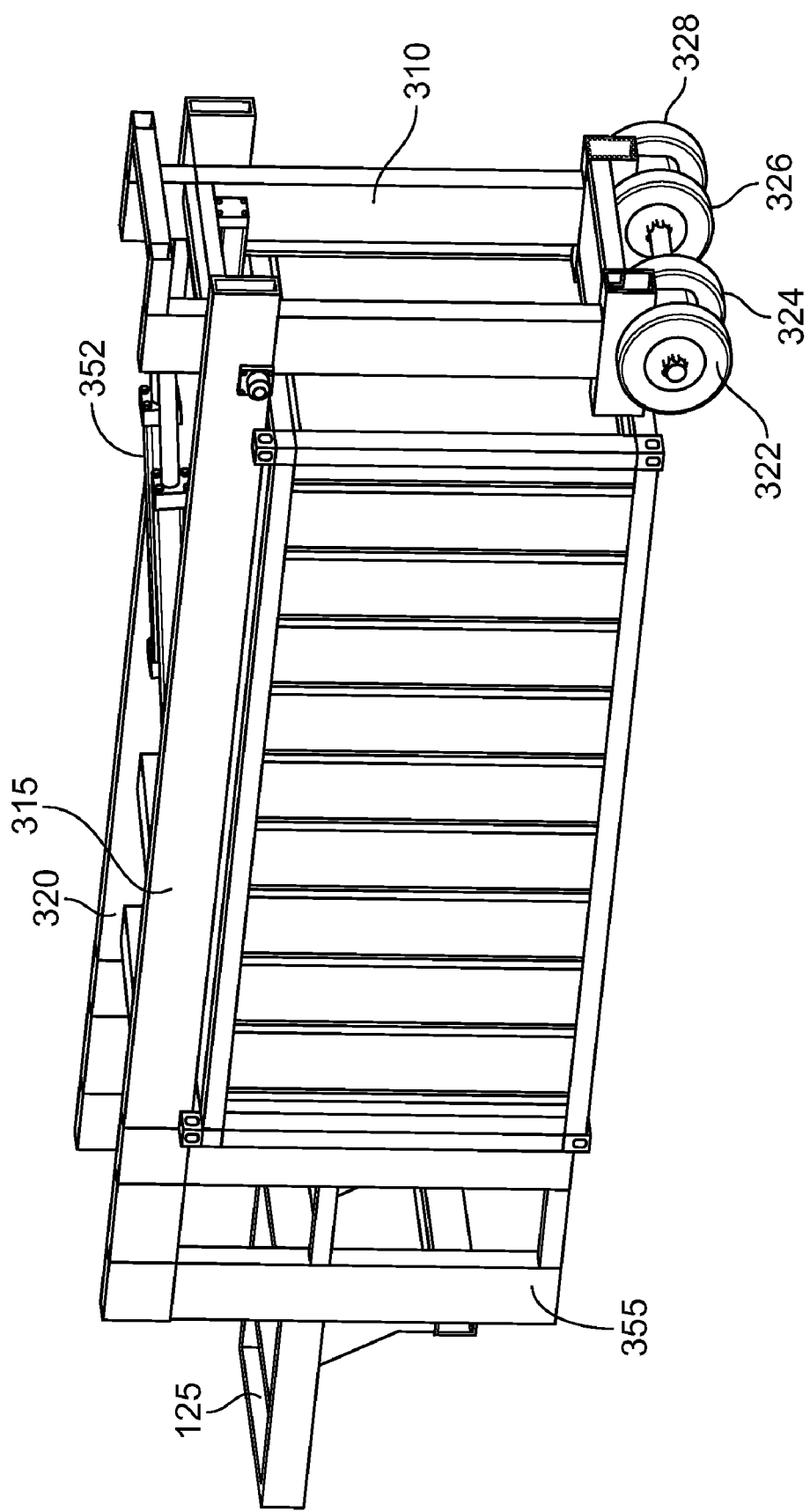
FIG. 5D is a perspective view of the trailer of FIG. 5A and the container in position for transport.

To position the frame 120b as a unit about the container 115, the user aligns the back end of the frame 120b adjacent the front face of the container 115, and pivots the rear frame member 310 to the horizontal position of FIG. 5B. The user then backs the trailer 110b so that the rear frame member 310 is positioned over the top of the container 115. The trailer 110b moves on the castor wheels 350 attached to the support member 336. Referring to FIG. 5C, as the user backs up, the contact wheels 366 engage the top of the container 115 to support the rear frame member 310 followed by the container 115 contacting the support member 336 to pivot the support member up and out of the way. The user backs up the trailer 110b to position illustrated in FIG. 5D, lowers the rear support frame 310 so that frame 120b rests on the road wheels, and loads the container 115 onto the frame 120b using cables and pulleys, as discussed above, to secure the container 115 to the frame 120b.

The user unloads the container 115 by lowering the container to the ground using the cables, raising the rear frame member 310, and driving forward. As the frame moves forward, wheels 366 initially roll over the top surface of the container 115, while the supporting member 336 pivots downward such that the castor wheels 350 make contact with the ground to provide support to the frame 120b. Once the frame 120b clears the container, the rear frame member 310 is lowered. The supporting member 336 can be, for example, biased toward the downward position by a spring mechanism, not shown.

Figure 6A:
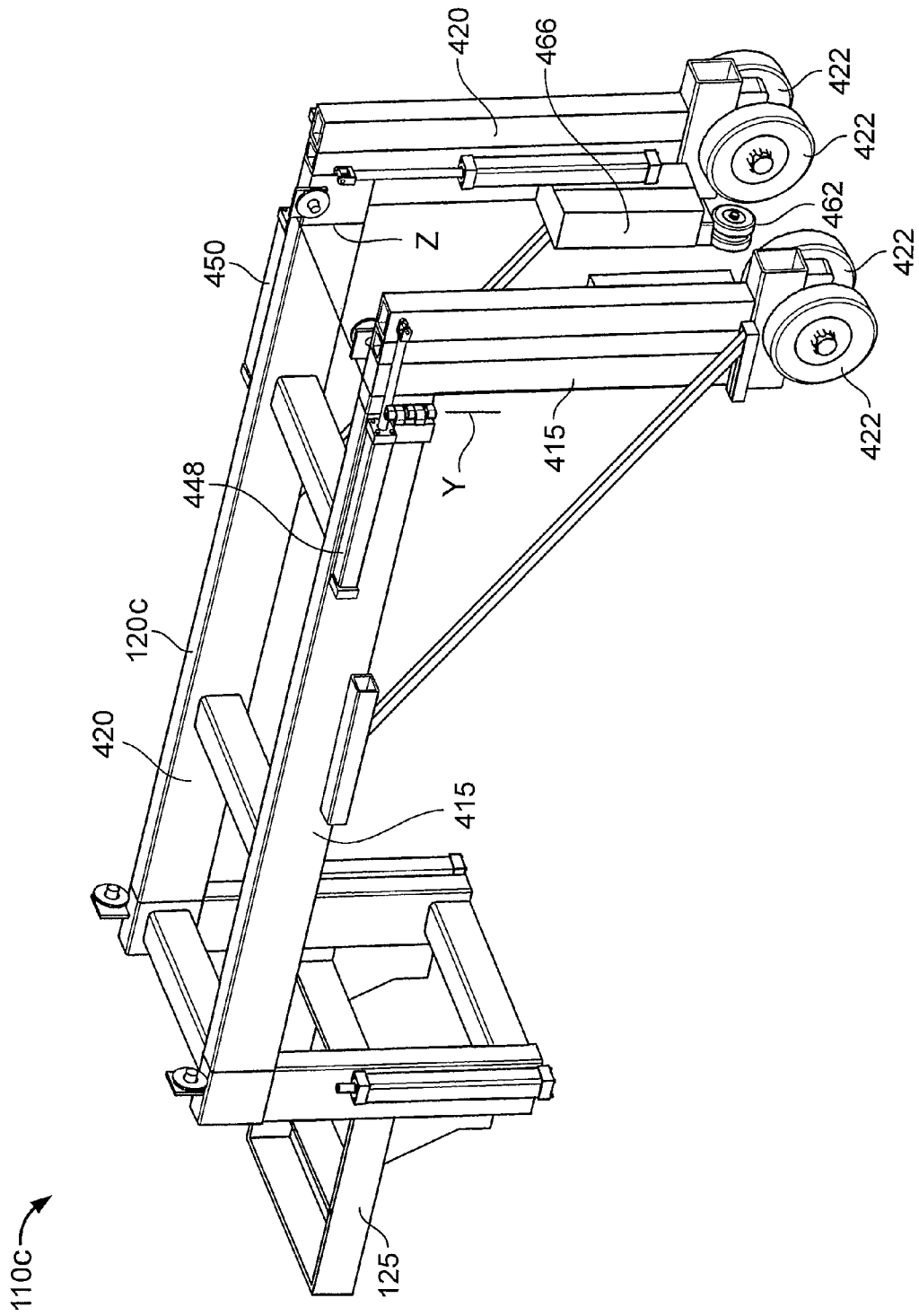
FIG. 6A is a perspective view another embodiment of a trailer shown with rear vertical members in an aligned configuration.
Figure 6B:
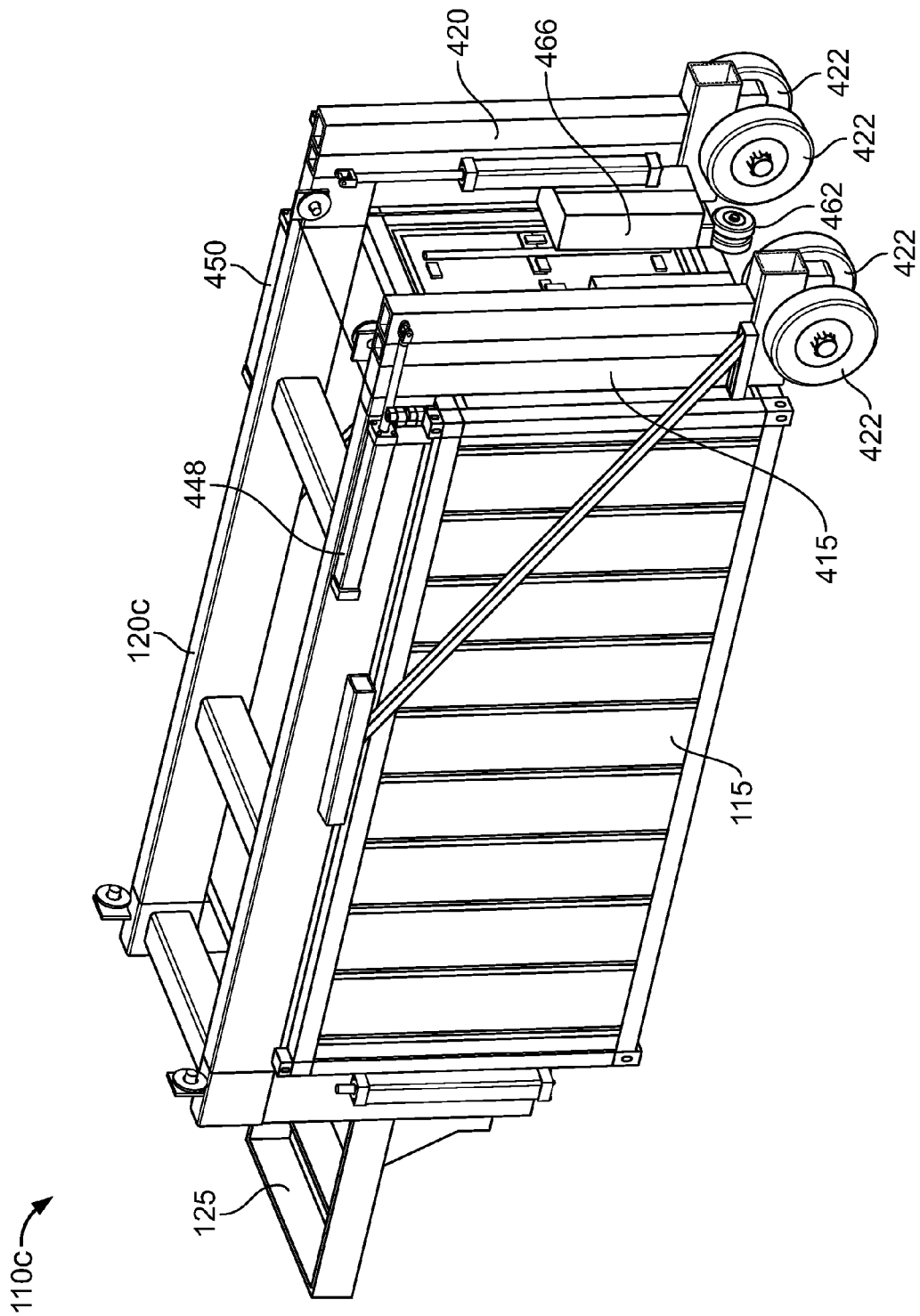
FIG. 6B is a perspective view of the trailer of FIG. 6A shown with the rear vertical members rotated out of alignment and positioned about a container.
Figure 6C:
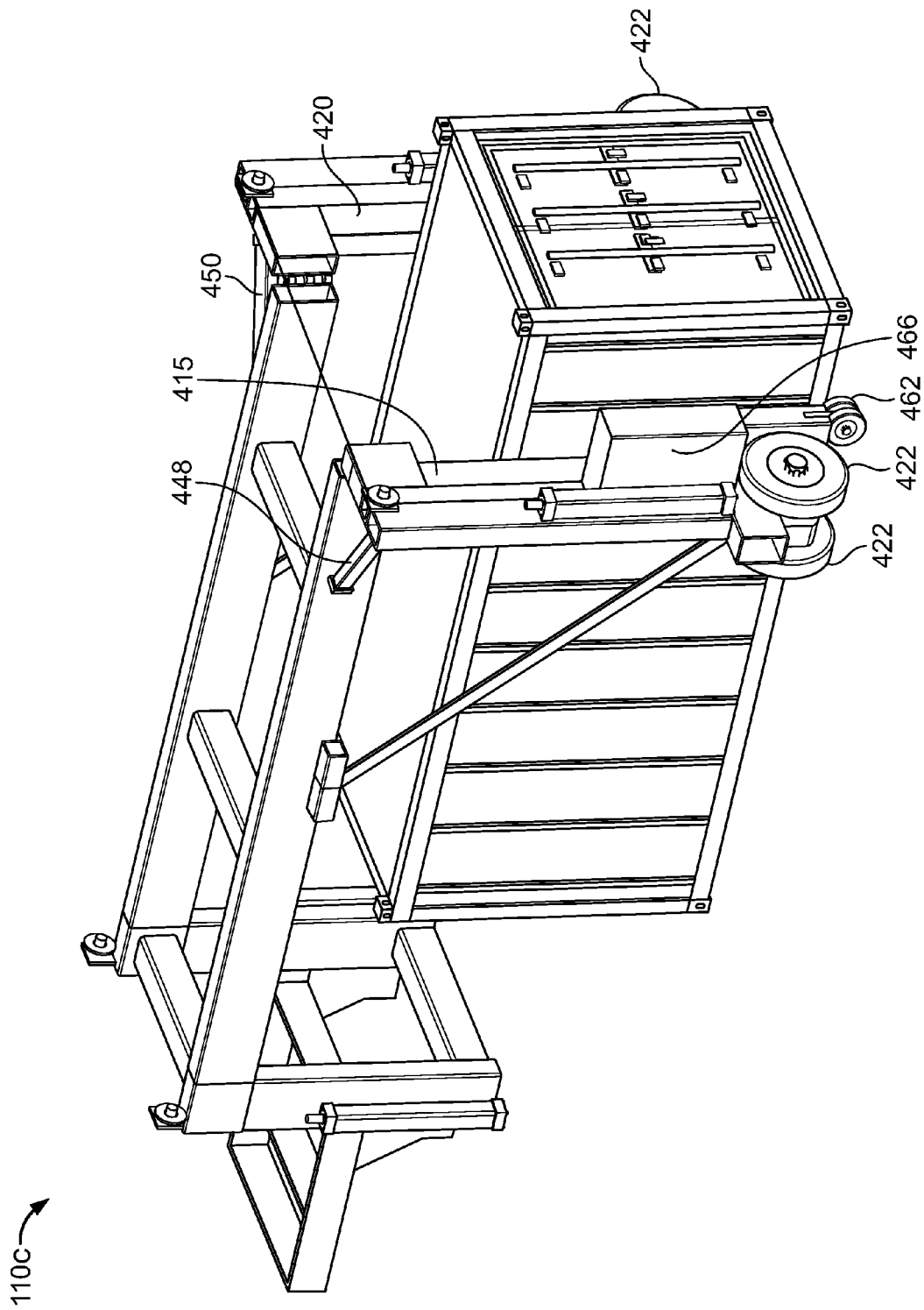
FIG. 6C is a perspective view of the trailer of FIG. 6A and the container in position for transport.

Referring to FIGS. 6A-6C, in another implementation, rather than a rear frame member that pivots about a horizontal axis, a trailer 110c includes a frame 120c having two rear vertical members 415, 420 that each pivot about a vertical axis, Y, Z, respectively. To load and unload the container 115, the members 415, 420 are pivoted outward using hydraulic pistons 448, 450 so that the trailer 110c clears the container. To support the frame 120c during pivoting of the members 415, 420, the members each include castor wheels 462 that can be extended into ground contact using actuators 466 to raise the road wheels 422 off the ground. For transport, the rear vertical members 415, 420 are pivoted inward on the castor wheels 462, the castor wheels are raised so the frame sits on the road wheels, and the container is secured to the frame as described above.

Other embodiments are within the scope of the following claims. For example, the first implementation of the trailer 110 can include a different number of road wheels attached to the frame 120 than illustrated. The transverse members need not be connected to the ends of the longitudinal members. Instead, the transverse members can be connected near the ends of the longitudinal members. Additional or fewer castor wheels can be attached to the frame to facilitate lateral expansion and retraction. Pulleys that are coupled with the cables to lift the container can be attached at any location on the vertical members. Alternatively, the pulleys can be coupled to any member of the frame. The frame 120 can include fewer transverse members. Alternatively, the frame can include additional vertical members connected by additional transverse members to load and unload the container, and to facilitate lateral expansion and retraction. The container can be larger or smaller than an ISO container. The dimensions of the members of the frame can be selected based on the dimensions of the container to be transported. The hooks or other fasteners at the ends of the cables can be attached to regions of the bottom surface of the container such that the container can be adequately supported. Such regions need not include the corner regions alone. Alternatively, or in addition, the cables can be attached to regions near the corners. The longitudinal members can include a lip on a top surface of the frame on which the container can rest.

With respect to the second implementation of the trailer 110, the upper ends of the vertical members need not be coupled to the back ends of the longitudinal members for pivoting. Alternatively, regions near the upper ends of the vertical members can be coupled to regions near the back ends. The frame 120 can include multiple support members based on the length of the longitudinal members, each support member including a corresponding castor wheel to facilitate trailer movement. Additional hydraulics can be coupled to the longitudinal member and attached to the support member to pivot the support member. Although FIGS. 5A-5D illustrate "H" shaped third and fourth vertical members, these vertical members can be of any shape. Further, the third and fourth vertical members can be shorter than the first and second vertical members. In such scenarios, to move the trailer, the road wheels of the tractor can be used. When the frame is lowered and the road wheels of the first and second vertical member are raised from the ground, the tractor can be moved away from the trailer to place the third and fourth vertical members on the ground.

In some scenarios, the first and second vertical members included in the frame of the third implementation of the trailer can have members attached to the upper end to provide an "L" shape or a "T" shape. These additional members can be coupled to the longitudinal members to facilitate pivoting. In some scenarios, instead of or in addition to using cables to lift the container, electric and/or hydraulic winches can be used.

Various features of the separate embodiments can be implemented in combination.

What is claimed is:

1. A trailer, comprising:
a coupling configured and arranged to attach a front end region of the trailer to a tractor by a fifth wheel; and
a frame attached to the coupling, the frame including
two longitudinal members extending generally from the front end region to a back end region of the trailer, the frame being positionable as a single unit about a container such that the frame can be attached to the container in regions of four corners of the container to lift corresponding front and back ends of the container, the frame being laterally actuatable between a first configuration permitting advancement of the frame relative to the container and a second configuration, the longitudinal members at least in the second configuration being able to be spaced apart such that the spacing between the longitudinal members is less than a side-to-side width of a container that has been attached to the frame and has had its front and back ends lifted by the frame,
road wheels for long-haul transportation of the trailer over conventional road systems, and
supporting wheels configured to support the frame when the road wheels are off the ground, the frame being configured to be positioned about the container when in the first configuration and power actuated to the second configuration while the frame is stationary relative to a for/aft direction of the trailer.

2. The trailer of claim 1 wherein the frame is configured to laterally expand to the first configuration and laterally contract to the second configuration, the frame being positionable as a single unit about the container by advancement of the frame relative to the container when expanded, and the frame being positioned for transport of the container when retracted.

3. The trailer of claim 2 wherein the frame is able to be actuated to the second configuration while moving only laterally.

4. The trailer of claim 1 wherein the regions of four corners comprise lower corners.

5. The trailer of claim 1 wherein in the second configuration the longitudinal members are configured and arranged to be able to support the container from underneath the container.

6. The trailer of claim 1 wherein each road wheel is mounted to one of the longitudinal members such that the road wheel is offset to a side of the longitudinal member.

7. The trailer of claim 1 wherein the frame includes hydraulic cylinders and cables that in use connect to the four corners of the container and run from the container to the hydraulic cylinders.

8. The trailer of claim 1 wherein the longitudinal members are able to be spaced apart to have an overall width less than the side-to-side width of the container.

9. A method comprising:
positioning a trailer as a single unit in a first configuration about a container, the trailer including two longitudinal members extending generally from a front end region to a back end region of the trailer, the trailer further including road wheels for long-haul transportation of the trailer over conventional road systems;
attaching the trailer to regions of four lower corners of the container;
lifting both end regions of the container off the ground using the trailer;
laterally actuating the trailer to a second configuration after positioning the trailer, the road wheels being off the ground during the actuating and the frame being supported by supporting wheels during the actuating, the longitudinal members at least in the second configuration being spaced apart such that the spacing between the longitudinal members is less than a side-to-side width of the container; and
attaching the front end region of the trailer to a tractor by a fifth wheel.

10. The method of claim 9 further comprising expanding the trailer to the first configuration to position the trailer about the container as a single unit.

11. The method of claim 10 wherein expanding the trailer comprises laterally expanding the trailer.

12. The method of claim 9 wherein actuating the trailer to the second configuration comprises retracting the trailer.

13. The method of claim 12 wherein retracting the trailer comprises laterally retracting the trailer.

14. The method of claim 9 wherein in the first configuration, the longitudinal members are spaced apart greater than a side-to-side width of the container.

15. The trailer of claim 9 wherein the longitudinal members are able to be spaced apart to have an overall width less than the side-to-side width of the container.

16. A trailer comprising:
a frame including:
two longitudinal members,
a third member connecting the two longitudinal members, the third member being actuatable to laterally expand and retract the frame such that the frame is positionable as a single unit about a container for attaching the frame to the container in four regions of the container to lift the container,
at least two road wheels for long-haul transportation of the trailer over conventional road systems, and
supporting wheels that support the frame when the road wheels are off the ground, the frame being configured to be positioned about the container when in the first configuration and power actuated to the second configuration while moving only laterally; and
a coupling configured and arranged to attach the trailer to a tractor by a fifth wheel.

17. The trailer frame of claim 16 wherein the frame further comprises at least one support wheel supporting the frame when the frame moves laterally.

18. The trailer of claim 16 wherein the four regions comprise four lower corners.

19. A trailer, comprising:
a coupling configured and arranged to attach a front end region of the trailer to a tractor by a fifth wheel; and
a frame attached to the coupling, the frame including
two longitudinal members extending generally from the front end region to a back end region of the trailer, the frame being positionable as a single unit about a container such that the frame can be attached to the container in four regions of four corners of the container to lift corresponding front and back ends of the container, the frame being laterally actuatable between a first configuration permitting advancement of the frame relative to the container and a second configuration, the longitudinal members at least in the second configuration being able to be spaced apart such that the spacing between the longitudinal members is less than a side-to-side width of a container that has been attached to the frame and has had its front and back ends lifted by the frame, and road wheels for long-haul transportation of the trailer over conventional road systems, each wheel being mounted to one of the longitudinal members such that the wheel is offset to a side of the longitudinal member.

20. A trailer, comprising:

a coupling configured and arranged to attach a front end region of the trailer to a tractor by a fifth wheel; and a frame attached to the coupling, the frame including two longitudinal members extending generally from the front end region to a back end region of the trailer, the frame being positionable as a single unit about a container such that the frame can be attached to the container in regions of four corners of the container to lift corresponding front and back ends of the container, the frame having an open top such that the container can extend above the frame, the frame being laterally actuable between a first configuration permitting advancement of the frame relative to the container and a second configuration, the longitudinal members at least in the second configuration being able to be spaced apart such that the spacing between the longitudinal members is less than a side-to-side width of a container that has been attached to the frame and has had its front and back ends lifted by the frame, road wheels for long-haul transportation of the trailer over conventional road systems, and supporting wheels configured to support the frame when the road wheels are off the ground.

21. A trailer, comprising:

a coupling configured and arranged to attach a front end region of the trailer to a tractor by a fifth wheel; and a frame attached to the coupling, the frame including two longitudinal members extending generally from the front end region to a back end region of the trailer, the frame being positionable as a single unit about a container such that the frame can be attached to the container in regions of four corners of the container to lift corresponding front and back ends of the container, the frame being laterally actuatable between a first configuration permitting advancement of the frame relative to the container and a second configuration, the longitudinal members at least in the second configuration being able to be spaced apart such that the spacing between the longitudinal members is less than a side-to-side width of the a container that has been attached to the frame and has had its front and back ends lifted by the frame, road wheels for long-haul transportation of the trailer over conventional road systems, and supporting wheels configured to support the frame when the road wheels are off the ground and configured to be moved off the ground when the road wheels are on the ground.

\* \* \* \* \*

UNITED STATES PATENT AND TRADEMARK OFFICE
CERTIFICATE OF CORRECTION

| | | |
|---|---|---|
| PATENT NO. | : 7,866,933 B2 | Page 1 of 1 |
| APPLICATION NO. | : 12/326643 | |
| DATED | : January 11, 2011 | |
| INVENTOR(S) | : James W. Welch | |

It is certified that error appears in the above-identified patent and that said Letters Patent is hereby corrected as shown below:

In claim 20, column 9, line 30, delete "actuable" and insert -- actuatable --, therefor.

In claim 21, column 10, line 24, delete "the a" and insert -- a --, therefor.

Signed and Sealed this
Eleventh Day of October, 2011

David J. Kappos
*Director of the United States Patent and Trademark Office*